UNITED STATES PATENT OFFICE.

HEINRICH KUBLI, OF BASEL, SWITZERLAND, ASSIGNOR TO THE HOFFMANN-LA ROCHE CHEMICAL WORKS, OF NEW YORK, N. Y., A CORPORATION OF NEW YORK.

PROCESS FOR THE MANUFACTURE OF EASILY-SOLUBLE COMPOUNDS OF THE C. C.-DIALKYLBARBITURIC ACIDS.

1,316,047. Specification of Letters Patent. Patented Sept. 16, 1919.

No Drawing. Application filed July 31, 1918. Serial No. 247,889.

*To all whom it may concern:*

Be it known that I, HEINRICH KUBLI, a citizen of Switzerland, and a resident of Basel, Switzerland, have invented certain new and useful Improvements in Processes for the Manufacture of Easily-Soluble Compounds of the C. C. - Dialkylbarbituric Acids, of which the following is a specification.

My invention relates to a new method for rendering the C. C.-dialkylbarbituric acids more easily soluble in water by allowing alkylamins to act upon them. The C. C.-dialkylbarbituric acids, which are very much used as soporifics, are but difficultly soluble in cold water. Their aqueous solutions are therefore not suitable for injections and the like purposes. In consequence of this deficiency the demand for easily soluble, injectable soporifics had to be covered with the sodium salts of the C. C.-dialkylbarbituric acids. These sodium salts are easily soluble in water, but the strongly alkaline solutions cause decomposition of the barbituric acids and in consequence thereof the products soon lose a great deal of their activity. The compounds of C. C.-dialkylbarbituric acids and alkylamins are crystallized bodies which dissolve easily in cold water and in alcohol especially when heated. Compared with the free dialkylbarbituric acids their hypnotic action is considerably greater, and their aqueous solutions are a great deal more stable than those of the sodium compounds.

The new products are to be used for therapeutic purposes.

*Example 1.*

1 part of very finely powdered diethylbarbituric acid is thoroughly stirred together with 0.55 parts of diethylamin. The heat produced causes the resulting mixture to dissolve into a clear syrup which soon coagulates. By exposing this compound of diethylbarbituric acid and diethylamin for a short time to the air it may be separated from an excess of diethylamin. It is very easily soluble in water, easily soluble in alcohol especially when heated.

*Example 2.*

1 part of finely powdered diallylbarbituric acid is transfused with 1 part of a 50 per cent. aqueous solution of diethylamin. A pulp is obtained which, through the heat produced by the reaction, becomes liquid and coagulates again when stirred. The reaction product is dissolved in a little 25 per cent. alcohol, filtered and evaporated *in vacuo* till crystallization sets in. The compound of diallylbarbituric acid and diethylamin crystallizes in woolly needles which dissolve very easily in cold water.

*Example 3.*

To 1 part of phenylethylbarbituric acid is added 1.5 parts of a 30 per cent. aqueous solution of dimethylamin. Through the heat produced by the reaction a syrup-like liquid is obtained from which, on being evaporated *in vacuo*, the compound of phenylethylbarbituric acid and dimethylamin crystallizes in large prisms. The compound dissolves easily in water.

*Example 4.*

1 part of diethylbarbituric acid is added to 6 parts of an aqueous solution containing 0.4 parts of diethylamin. The diethylbarbituric acid is completely dissolved and the resulting solution, which according to circumstances may have to be filtered beforehand, is ready to be used for therapeutic purposes.

The new compounds are to be looked upon as salts of the C. C.-dialkylbarbituric acids. Their formulas are the following:

(1) Diethylbarbituric acid - diethylamin (Examples 1 and 4):

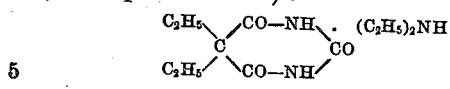

(2) Diallylbarbituric acid - diethylamin (Example 2):

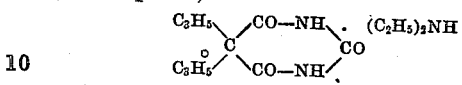

(3) Phenylethylbarbituric acid - dimethylamin (Example 3):

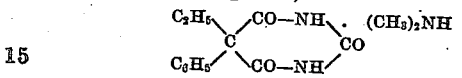

I claim:

1. As a new article of manufacture the easily soluble compounds of the C. C.-dialkylbarbituric acids and alkylamins substantially as described.

2. The process for the manufacture of easily soluble compounds of the C. C.-dialkylbarbituric acids by allowing alkylamins to act upon the said acids.

In witness whereof I have hereunto set my hand.

HEINRICH KUBLI.

Witnesses:
J. E. BARELL,
EDUARD L. NENK.